Jan. 9, 1934. J. E. MITCHELL 1,942,868
METHOD OF AND APPARATUS FOR DRYING COTTON
Filed April 16, 1932 2 Sheets-Sheet 1
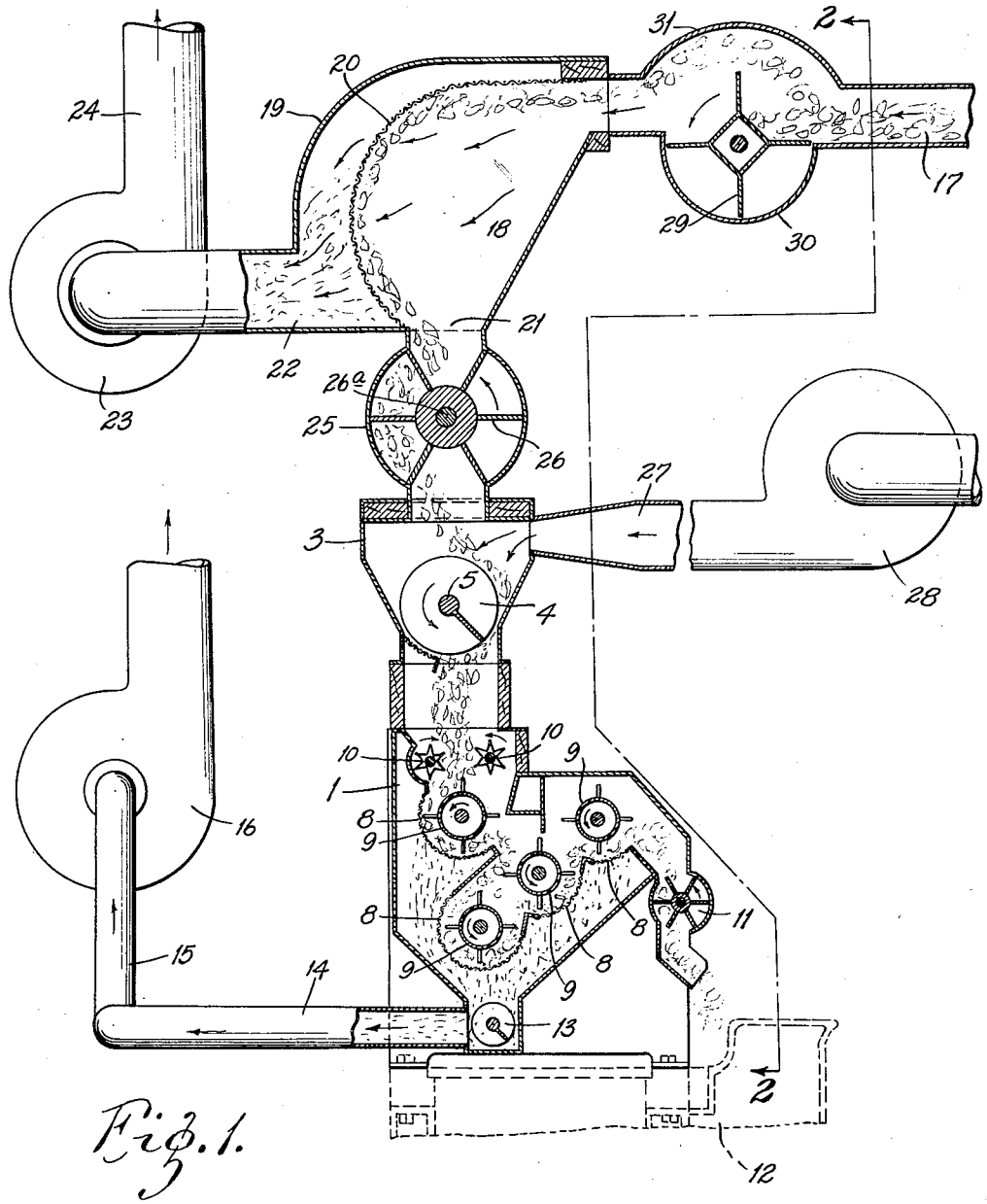
INVENTOR:
JOHN E. MITCHELL.
BY Bruce S. Elliott
ATTORNEY.

Jan. 9, 1934.  J. E. MITCHELL  1,942,868
METHOD OF AND APPARATUS FOR DRYING COTTON
Filed April 16, 1932  2 Sheets-Sheet 2
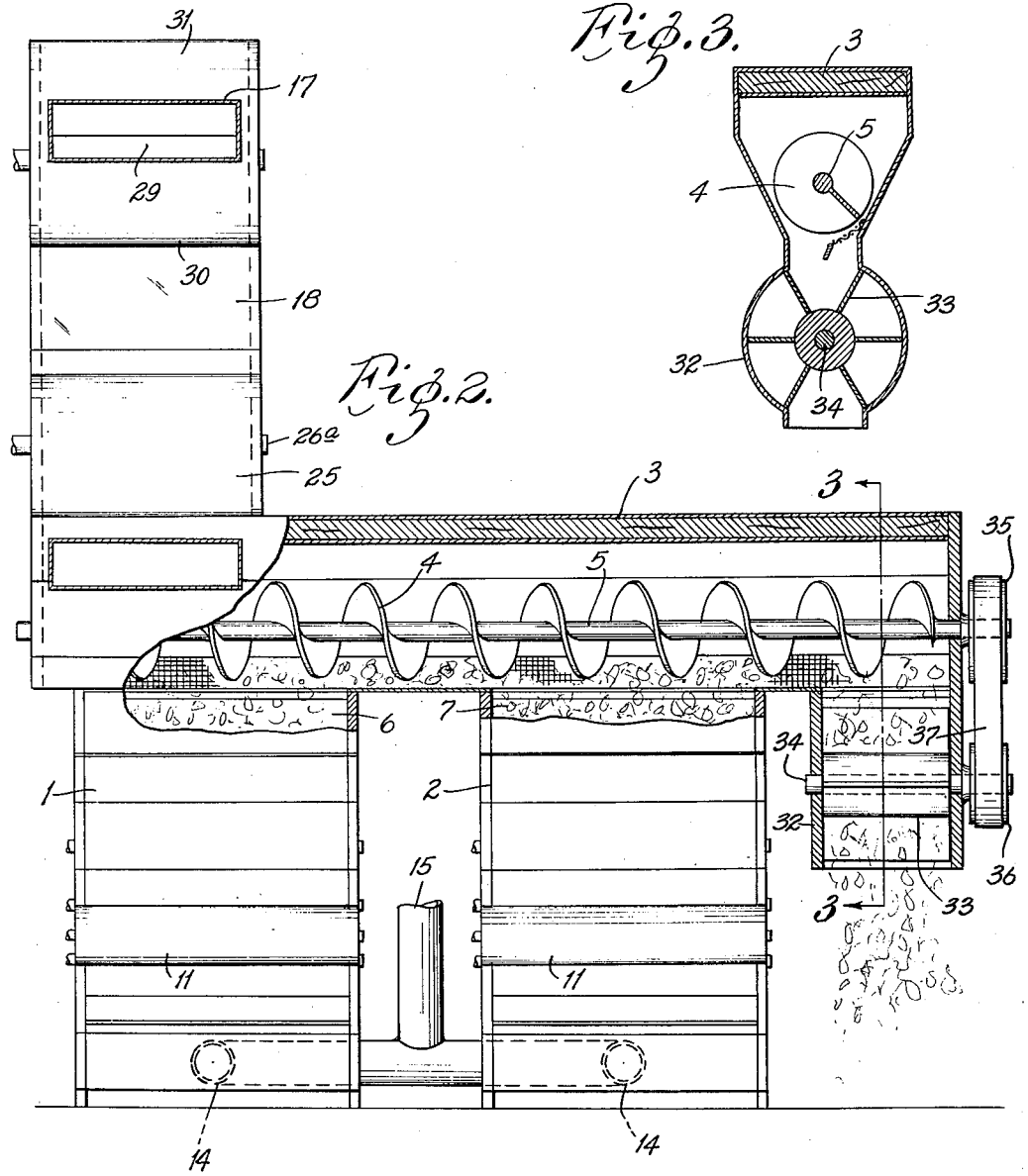
INVENTOR
JOHN E. MITCHELL
BY Bruce S. Elliott
ATTORNEY Patented Jan. 9, 1934

1,942,868

UNITED STATES PATENT OFFICE 1,942,868

METHOD OF AND APPARATUS FOR DRYING COTTON

John E. Mitchell, Dallas, Tex.

Application April 16, 1932. Serial No. 605,561

3 Claims. (Cl. 19—74)

This invention relates to the art of treating cotton to dry the same, and has for its general object the provision of a novel means for and method of acting upon the cotton in such way that the drying of the cotton is accomplished during the normal progress of the cotton from the wagons, or other source of supply, to and through the cleaning machines.

The different methods or machines now used for drying cotton involve bringing heated air into contact with the damp cotton in special drying machines before the cotton reaches, or is delivered to the cleaning machinery. Usually the cotton, as it is unloaded from wagons, is delivered to a slowly revolving drum, or some other form of closed chamber, through which a stream of heated air is forced and caused to be brought into contact with the cotton as it passes through the drying chamber.

This method of drying requires long exposure and an extravagant use of heated air to dry the compact locks of damp cotton as it is brought to the gin house in wagons, because it is practically impossible to secure intimate exposure or contact of the fibers of the locks of cotton with the heated air.

Again, when the cotton is delivered direct to drying chambers, or revolving cylinders, as it is unloaded from wagons, it reaches the same in more or less irregular masses, which increases the difficulty of securing intimate contact of the heated air with all the fibers of the cotton carrying excess moisture.

Finally, the cotton must be unloaded at a more rapid rate than it is being ginned; hence, a considerable portion of the cotton, after passing through the drying chamber, and thence to the distributor above the gins, is over-flowed at the end of the distributor, where it falls onto the floor; and before it can be ginned, it absorbs more or less moisture, depending upon atmospheric conditions.

The above objections incident to the conventional methods of drying cotton are all overcome in the present invention, wherein, I am enabled to dry the cotton during the normal movement of the cotton from the wagons to and through the cleaning or extracting machines.

One of the principal features of the invention, and a principal step in the method hereinafter claimed, consists in fluffing the individual locks of cotton prior to subjecting the cotton to the action of the drying agent, preferably heated air, whereby the heated air can readily come into intimate contact with all of the fibers belonging to the individual seeds of the cotton and thus rapidly absorb and remove the excess moisture. Such fluffing of the cotton greatly reduces the time required for drying it, and it is this fact which makes it possible to dry the cotton simultaneously with the distribution and cleaning thereof, and thus avoid the expense and loss of time involved in separately cleaning the cotton.

The invention in its broadest aspect, and considered as a method, consists in withdrawing the cotton from a source of supply, mechanically fluffing it, and then passing it through a zone of heat. As related to the embodiment of the invention disclosed herein, the invention in detail consists in withdrawing the cotton from a source of supply and mechanically fluffing it; delivering the fluffed cotton to the enclosed housing of a distributor and distributing the fluffed cotton to the individual hoppers of a battery of cotton cleaning machines; and during the distributing operation forcing a current of heated air into the housing of the distributor and through said hoppers, and causing the heated air to pass by suction through the cotton cleaning machines.

The apparatus involved in the practice of my invention comprises a conduit leading from the source of cotton supply to a separator; a suction fan cooperating therewith; a mechanical fluffer interposed in the length of said conduit; an enclosed distributor; an air seal dropper for delivering the fluffed cotton received from the separator to the distributor; a source of hot air communicating with said distributor; a battery of cotton cleaning machines, each of which machines has a hopper communicating with said distributor, through which the fluffed cotton is supplied to the machine; a source of suction communicating with the bottoms of the cleaning machines for drawing the heated air through said hoppers and the cleaning machines and discharging it out of doors; and an air seal dropper for discharging the cleaned cotton from each cleaning machine. This apparatus is illustrated in the accompanying drawings, in which:—

Figure 1 is a cross sectional view through the complete system, taken through the vertical plane of one of the cotton cleaning machines of a battery;

Figure 2 is a front elevational view taken on the line 2—2 of Figure 1; and

Figure 3 is a cross sectional view through the distributor and the air seal dropper shown at the right of Figure 2.

Referring now to the drawings, the numerals 1, 2, indicate, respectively, cotton extracting or cleaning machines arranged in line and over the top of which is arranged a housing, 3, in which is mounted a distributor, 4. This distributor is preferably of the conveyor type, as shown, its shaft, 5, being journalled in opposite ends of the housing 3. I prefer the conveyor type of distributor because of its gentle action upon the cotton, and of the further fact that it does not pack the fluffed cotton within the hoppers supplying the cleaning machines. Depending from the bottom of the housing 3 at intervals are hoppers, 6, 7, respectively, which open into the upper ends of the cleaning machines 1, 2, and through which hoppers the cotton is supplied by the distributor 4 to said machines.

As shown by Figure 1, the type of cleaning machine I prefer to use is one consisting of a series of screens, 8, with cooperating beating cylinders, 9, and a pair of feed rolls, 10, located immediately below the hopper of the distributor for delivering the cotton in regulated quantities to the cleaning mechanism. The cotton is passed over the screens by the beating cylinders, four of which are shown, and small trash particles and dirt are separated from the cotton thereby.

In place of this form of cleaner, however, I could as well employ the cotton extracting type, in which a saw cylinder is employed for extracting the cotton while the hulls and hull particles are mechanically separated from the cotton. Both types of cleaning and extracting machines are well known, and I have simply illustrated a conventional type of cleaning machine as being the form of cleaning machine I prefer to employ in practicing the present invention.

With either form of cleaning machine, I provide an air seal dropper, 11, for discharging the cleaned cotton to the gin, 12, below, while preventing cold air from passing into the cleaning machine. At the lower end of each of the cleaning machines I provide a trash conveyor, 13, which delivers the trash to a suction pipe, 14, one of said pipes communicating with the bottom of each cleaning machine, and the various pipes 14 communicating with a common suction pipe, 15, leading to the inlet side of a suction fan, 16.

Referring to the upper part of Figure 1, the numeral 17 indicates a suction conduit, the remote end of which is usually provided with a flexible connection (not shown) located in position to be applied in withdrawing the seed cotton from a wagon or other source of supply. The opposite end of the conduit, that at the left of Figure 1, is connected to a separator, 18, comprising a casing, 19, having a curved screen, 20, leading downward to one side of an outlet opening, 21. Leading from the separator is a pipe, 22, which connects to a suction fan, 23, said fan having a discharge pipe, 24, communicating with its casing at the opposite or discharge side. The opening 21 from the separator communicates with the upper end of a circular casing 25, the lower end of which communicates with the top of the distributor housing, 3, at one end thereof, or that at the left as shown in Figure 2. Within the housing 25 is a pocket wheel, 26, the shaft, 26a, of which is journalled in the ends of the casing 25. The casing 25 and the pocket wheel 26 forming an air seal dropper for delivering cotton from the separator 18 to the distributor housing 3.

According to my invention, I provide for forcing a stream of heated air into the housing 3, and to this end I connect to said housing a pipe, 27, leading from a furnace for supplying heated air, and at a suitable point in the length of this pipe I arrange a fan, 28, for forcing the heated air through pipe 27 into the housing 3 and into the hoppers 6 and 7. I may either employ a single pipe 27 connected at any suitable point with the housing 3, or I may provide such pipes at either end of the housing, as requirements may indicate to be desirable.

For fluffing the locks of cotton, I locate at a suitable point in the length of the suction conduit 17, preferably near the separator 18, a fluffing wheel, 29, which is enclosed on its lower side by a semi-circular enlargement, 30, of the lower wall of conduit 17, and above said wheel, and at a distance therefrom, I provide a similar but larger semi-circular enlargement, 31, of the upper wall of the conduit.

At the discharge or overflow end of the distributor housing 3, I may provide an air seal dropper, shown in section in Figure 3, which, as usual, comprises a circular casing, 32, and a pocket wheel, 33, mounted on a shaft, 34, journalled in the end walls of a casing 32. I wish it understood, however, that the use of an air seal dropper at the discharge end of the distributor housing is not an essential of the invention, although it is specifically claimed as a desirable feature. It is entirely feasible to increase the suction produced by the fan 16 to such an extent as to overcome any tendency of the heated air introduced into the housing 3 to pass out at the discharge end, even should this end be left open.

I have shown on the end of the shaft 5 of the conveyor a pulley, 35, and on the corresponding end of shaft 34 a pulley, 36, over which pulleys runs a belt, 37. I have not shown driving mechanism for the various rotatable parts of the apparatus, such as the fluffing wheel 29, pocket wheel 26, conveyor 4, and the beating cylinders of the cleaning machines, as such driving mechanism is of the conventional type, usually consisting of pulleys on the ends of the various shafts of these members connected by belts.

In lieu of such illustration, I have simply indicated by arrows the direction of rotation of these various members.

I have shown in the drawings only two cleaning machines arranged in line, but it will be understood that ordinarily there will be a considerable number of such machines. The principle of operation, however, is fully illustrated by the use of two machines, and, in fact, is the same whether one, or any greater number, of cleaning machines is employed.

The operation is as follows:

The cotton being unloaded from wagons and drawn by suction fan 23 through the conduit 17 comes into contact with the impact fluffing wheel 29. This fluffing wheel runs at a high rate of speed in the direction shown by the arrow, so that the locks of cotton drawn by the air current into contact with the blades of the wheel are thrown with sufficient force against the housing 31 to fluff the locks up to two or three times their normal size. The stream of fluffed cotton, after passing the fluffing wheel, is drawn into the separator or exhauster 18, from which the air utilized for elevating the cotton passes through the screen 20 to the exhaust fan 23, which delivers the air, with whatever trash passes through the screen, out of doors. The cotton separated from the air in the separator falls into the revolving pocket wheel 26, which not only delivers the cotton to the distributor housing 3, but acts as an air seal to prevent the leakage of air from the distributor back up into the separator.

The distributor housing 3 is preferably, but not necessarily, completely enclosed except for the open bottom portions thereof communicating with the tops of the hoppers 6 and 7. The conveyor 4 moves the cotton over said hoppers, and as fast as each hopper over a cleaning machine above each gin stand 12 is filled, the excess cotton is carried by the conveyor distributor to the next hopper until all the hoppers of an entire battery are filled. That portion of the cotton being elevated in excess of the rate at which it is being ginned, is discharged at the end of the distributor through the revolving wheel 33, which, with its casing 32 acts as an air seal dropper, and serves to prevent the leakage of air from the distributor housing with the excess cotton discharged at the over-flow. If an air seal dropper at the end of the distributor housing should not be employed, the leakage of heated air with the overflow cotton can substantially be prevented by increasing the suction of fan 16, as previously indicated. This is particularly true when the source of the heated air is not so far removed from the distributor as to render the use of the fan 28 necessary. The feeding rollers 10 of each machine deliver a regulated, uniform stream to the cleaning mechanism.

While the distributing and cleaning of the cotton is taking place, hot air from a furnace, or other suitable heating element, is forced through pipe 27 into the distributor housing 3. The air seal or pocket wheel 26 prevents the heated air from leaking into the separator 18, and the wheel 33 of similar construction, when employed, prevents the escape of heated air at the overflow end of the distributor. Thus, the only outlet for the heated air forced into the conveyor housing 3 is down through the cotton contained within the hoppers 6 and 7 of the distributor and on into the cleaning machines.

After the cotton has passed through the extracting and cleaning machinery, it is discharged to the gin stand 12 below through the air seal dropper 11, which seals against cold air being drawn into the machinery. The hot air, as it is forced down from the distributor housing through the loose body of fluffed cotton within the hoppers, remains in intimate contact with the fibers of each lock of cotton while it is being acted upon by the cleaning or extracting mechanism, and the hot air carrying the moisture removed from the cotton passes through outlet suction pipes 14 from the individual cleaning machines to the hot air fan 16, which blows it out of doors.

The trash removed by the cleaning mechanism during the process of drying the cotton, is delivered by the conveyors 13 under the cleaning machines, and is carried through the hot air outlet 14 to the suction fan 16, which blows it out of doors.

In some installations, only two suction fans need be employed, the fan 23, which moves only cold air for unloading and elevating the cotton and forcing it into contact with the blades of the fluffing wheel, and the hot air fan 16, which not only operates to draw the hot air through the pipe 27 into the distributor housing, but also to draw said heated air through the hoppers 6 and 7 and the cleaning machines 1 and 2 through the pipes 14 to the discharge. In cases, however, where a relatively large number of cleaning machines are employed, or where the hot air delivered through pipe 27 is brought from a considerable distance, a third fan 28 is desirable to supplement the suction of the fan 16 in causing the stream of heated air to pass through the hoppers and into and through the cleaning machines.

I claim:

1. The method of treating cotton which consists in withdrawing the cotton from a source of supply and distributing the same to a plurality of cotton treating machines, and while distributing the cotton drying it by subjecting the cotton being distributed to the action of heated air.

2. The method of treating cotton which consists in withdrawing the cotton from a source of supply and distributing the same to a plurality of cotton treating machines, mechanically fluffing the cotton during the course of its movement to the distributing mechanism, and while distributing the cotton drying it by subjecting the cotton being distributed to the action of a current of heated air.

3. Combined cotton distributing and drying mechanism comprising a suction conduit for withdrawing cotton from a source of supply, a separator associated therewith, an enclosed cotton distributor, an air seal dropper for delivering cotton from the separator to said distributor, an air seal dropper for discharging over-flow cotton from said distributor, and means for supplying a current of heated air to said distributor.

JOHN E. MITCHELL.